(12) United States Patent
Long et al.

(10) Patent No.: US 11,455,111 B2
(45) Date of Patent: Sep. 27, 2022

(54) ADAPTIVE STORAGE MANAGEMENT POLICIES FOR COMPUTING DEVICES

(71) Applicant: MICROSOFT TECHNOLOGY LICENSING, LLC, Redmond, WA (US)

(72) Inventors: Ping Long, Bellevue, WA (US); Daniel Bressane Bezerra, Kenmore, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/988,550

(22) Filed: Aug. 7, 2020

(65) Prior Publication Data

US 2020/0379663 A1 Dec. 3, 2020

Related U.S. Application Data

(63) Continuation of application No. 16/427,279, filed on May 30, 2019, now Pat. No. 10,754,568.

(51) Int. Cl.
*G06F 12/00* (2006.01)
*G06F 3/06* (2006.01)

(52) U.S. Cl.
CPC .......... *G06F 3/0643* (2013.01); *G06F 3/0605* (2013.01); *G06F 3/067* (2013.01); *G06F 3/0607* (2013.01); *G06F 3/0608* (2013.01)

(58) Field of Classification Search
CPC ...... G06F 3/0643; G06F 3/067; G06F 3/0608; G06F 3/0607; G06F 3/0605
See application file for complete search history.

(56) References Cited

U.S. PATENT DOCUMENTS

2015/0208205 A1 7/2015 Chan et al.
2015/0373107 A1 12/2015 Chan et al.

OTHER PUBLICATIONS

"International Search Report and Written Opinion Issued in PCT Application No. PCT/US2020/029174", date Jul. 30, 2020, 15 Pages.

*Primary Examiner* — Jason W Blust
(74) *Attorney, Agent, or Firm* — Newport IP, LLC; David W. Foster

(57) ABSTRACT

The techniques disclosed herein provide adaptive storage techniques for maximizing the available storage space of a file storage system. An adaptable multi-phase storage management process may involve a background process and a user process. The background process can autonomously offload files that comply with a confidence level defined in a storage policy. The user process can selectively offload files based on a user response to a prompt identifying specific files that do not comply with the confidence level. Continual adjustments can be made to the storage based on user activity that allows a system to make more accurate determinations on the selection of operations for increasing the available storage space of a system.

20 Claims, 10 Drawing Sheets

| CONTEXTUAL INFORMATION 136 |
|---|
| GUI 138 HISTORICAL INFORMATION (520) |
| GUI Displayed 5/13/2019 – Closed with no response<br>GUI Displayed 5/14/2019; displayed with prominence – User interaction detected; <files accepted for offload>; <files accepted for deletion>; <files ignored><br>GUI Displayed 5/15/2019 – User interaction detected; <files accepted for deletion>; <files ignored> |
| USER HISTORICAL INFORMATION (522) |
| File Directory Use – <most used file directories>; <least used file directories><br>Specialized Equipment Use – <derived from file metadata>; <derived from user profile metadata><br>Application Use – <most used applications>; <least used applications>; <paid applications>; <free applications>; <enterprise applications><br>User Metadata – <job profile metadata; interests metadata> |
| ADDITIONAL INFORMATION (524) |
| Exempt Data – <exempt files>; <exempt directories> |

*FIG. 5B*

| USER CONTENT RETENTION POLICY 144 |
|---|
| FILE TYPES RULES – AUTONOMOUS OFFLOADING/DELETION (526) |
| Temp Files Delete – <temp file extensions>; <temp file directories><br>Log Files Delete – <log file extensions>; <log file directories><br>Recycle Bin – <recycle bin directories><br>Install Files – <install file directories><br>Kernel Report Files -- <report file directories> |
| FILE TYPE RULES – DISPLAY IN GUI 138 (528) |
| Archive Files Delete – <archive file directories><br>Duplicate Files Finder<br>Unused/Old Application Finder |
| CONTEXTUAL INFORMATION 136 BASED RULES (530) |
| Do Not Remove – <file types>; <directories><br>Purchased Applications – <application list><br>Enterprise Applications – <application list><br>User Profile Metadata Derived – <special application/equipment files>; <directories> |

*FIG. 5C*

ADAPTIVE STORAGE MANAGEMENT POLICIES FOR COMPUTING DEVICES

CROSS REFERENCE TO RELATED APPLICATIONS

This application is a continuation of and claims priority to U.S. application Ser. No. 16/427,279, entitled "ADAPTIVE STORAGE MANAGEMENT POLICIES FOR COMPUTING DEVICES," filed May 30, 2019, which is incorporated herein in its entirety.

BACKGROUND

Computing devices, such as laptop computers and mobile computing devices, are used for communication, entertainment, work, and a variety of other functions. However, these computing devices typically have limited local storage space, which limits the amount of data that a user may maintain on those computing devices.

Data stored in computing devices may be manually moved to a distributed storage when it is not in use. Furthermore, some data stored in computing devices may be deleted by the user when it is no longer needed. However, moving data to distributed storage can be time consuming, causing inefficient use of a user's time and wasting computer resources, such as battery life and processor use. Similarly, searching a computing device's local storage for data that is no longer needed is also inefficient and wastes computer resources.

Some conventional techniques may reduce local storage consumption by moving files, from local storage to distributed storage, that have not been used or modified for a predetermined time, such as six months. Other conventional techniques may reduce local storage consumption by deleting temporary files, such as temporary Internet files and system files, unused or old log files, based on the file extensions of those files. However, the conventional techniques for reducing local storage generally use rigid rules, often linked to a background process executed by a computing device, to decrease local storage consumption. Those conventional techniques only minimally reduce wasted computer resources and user inefficiencies related to monitoring and maintaining local storage consumption in computing devices.

SUMMARY

The techniques disclosed herein provide adaptive storage techniques for maximizing the available storage space of a file storage system. More specifically, the present disclosure offers an adaptable multi-phase storage management process that involves: (1) a background process and (2) a user process. The background process can autonomously offload files that comply with a confidence level defined in a storage policy. The user process can selectively offload files based on a user response to a prompt identifying specific files that do not comply with the confidence level. User activity solicited from the user process can be analyzed by a machine learning service to modify aspects of the storage policy. Continual adjustments made to the storage based on user activity allows a system to make more accurate determinations on the selection of operations for increasing the available storage space of a system.

In some configurations, adjustments to the policy can also cause the system to select different types of offloading operations that apply to different types of files. For instance, a system can delete, move, dehydrate, compress, or upload certain files based on a dynamically adjusted policy. By applying contextually relevant offloading actions to specific types of files, a system can increase the available storage space of a system. As described in more detail below, various offloading operations can be selected based on contextual data defining user activity associated with the files, an activity priority of one or more files, a detected use of specialized applications, or a detected use of specialized equipment.

In some configurations, a multi-phase storage management process can start with a background process that identifies files for offloading. Those files meet a confidence level that would allow for autonomous removal of those additional files. Then, the multi-phase storage management process can involve a user process for additional files that do not meet the confidence level. The additional files are presented to a user to seek approval to offload the additional files. User approval to offload some or all of the additional files may be leveraged to modify the background process so that the background process can autonomously offload files of the same file types as those files approved for offload by the user.

At least one described implementation provides a technical solution for reducing local storage consumption in a computing device through a graphical user interface (GUI) that identifies applications and files that may be moved to a distributed storage, dehydrated, and in some cases deleted, based on contextual information linked to a user of the computing device. For example, the user's computer file and directory use, the user's profile including job or other metadata, the user's use of specialized applications or equipment and so forth may be used to formulate the contextual information that is leveraged by the computing device in selecting the applications and files identified in the GUI.

In some implementations, the contextual information is at least partially derived from a user's interaction with the GUI that identifies applications and files that may be moved to the distributed storage, dehydrated or deleted. For example, a computing device displaying the GUI may detect and analyze a user's interactions, with the GUI, approving and disapproving of suggested actions that may be taken with respect to the applications and files identified in the GUI. The analysis and machine learning performed by the computing device may provide a basis for adding or removing the types of applications and files that are identified in the GUI. Alternatively, or in addition, the analysis and machine learning performed by the computing device may provide a basis for modifying a local storage reduction background process by adding or removing the types of applications and files that may be offloaded when the background process is executed.

Furthermore, in some implementations, the local storage reduction background process, once modified, replaces a prior version of the background process. The modified background process may be linked to a user, such as profile metadata of the user. The modified background process may be shared with multiple computing devices belonging to or used by the user. Therefore, at least some of the described implementations provide a personalized local storage reduction background process that is consistent across the computing devices linked to the user.

In some implementations, the GUI that identifies files that may be moved to the distributed storage is displayed subsequent to the execution of a background process that deletes, moves or dehydrates files to reduce local storage consumption in the computing device. The background process deletes, moves or dehydrates files using rigid rules for deleting, moving or dehydrating files. For example, the GUI that identifies files that may be moved to distributed storage may be generated when local storage consumption remains below or equal to a minimum storage threshold after the background process has executed.

The GUI that identifies files that may be moved to distributed storage may be displayed for a predetermined time, awaiting user input, before the GUI is automatically closed. After some predetermined time, the GUI may be subsequently displayed when the local storage consumption remains below or equal to the minimum storage threshold for a predetermined time period. The GUI may have an enhanced appearance when it is subsequently displayed. For example, the GUI may have a larger size, fixed location, use larger fonts, implement bold colors or highlighting, when it is displayed subsequently.

In some implementations, a content retention policy includes one or more file modification confidence criteria groups that include data identifying file types. The data identifying the file types may indicate file extensions of those file types identified in the confidence criteria groups. The content retention policy, when executed, may identify a file for removal from a local storage by leveraging the confidence criteria groups.

The content retention policy may determine a file modification confidence level associated with the file for removal from the local storage. Specifically, the confidence level may be determined by comparing the file type of the file for offload from the local storage against the data identifying the file types associated with the one or more file modification confidence criteria groups. A low file modification confidence level linked to the file for removal necessitates user authorization before the file is offloaded from the local storage. A high file modification confidence level linked to the file for removal does not require user authorization before the file is offloaded from the local storage.

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithm(s), hardware logic, and/or operation(s) as permitted by the context described above and throughout the document.

BRIEF DESCRIPTION OF THE DRAWING

The detailed description is described with reference to the accompanying figures. In the figures, the left-most digit(s) of a reference number identifies the figure in which the reference number first appears. The same reference numbers in different figures indicate similar or identical items.

FIGS. 2-5A illustrate the exemplary system to include an illustration of a graphical user interface (GUI), according to some implementations.

FIG. 5B illustrates example contextual information resultant from computer leaning performed by the disclosed exemplary systems, according to some implementations.

FIG. 5C illustrates an exemplary user content retention policy of the exemplary system, according to some implementations.

DETAILED DESCRIPTION

Some conventional computing devices implement an automated background process that offloads temporary files and unused log files from computer storage to increase the space available in the computer storage. Generally, the automated background process functions using rigid rules defining the types of files that may be offloaded from the computer storage. The rigid rules, used by automated background processes designed to increase the space available in computer storages, generally do not effectively increase the space available in computer storages.

A technical solution is provided for reducing local storage consumption in a computing device. A background process that offloads files from a local storage may be executed by a computing device. The background process automatically offloads files identified using rules that identify files for autonomous machine offloading from the local storage.

The background process may identify additional files for offload. Those additional files may not meet a confidence level that would allow for autonomous removal of those additional files. Therefore, those additional files are presented to a user to seek approval to offload the additional files. User approval to offload some or all of the additional files may be leveraged to modify the background process so that the background process can autonomously offload files of the same file types as those files approved for offload by the user.

At least one described implementation provides a technical solution for reducing local storage in a computing device through a graphical user interface (GUI) that identifies directories, applications and files that may be moved to a distributed storage (e.g., the cloud), dehydrated, and in some cases deleted, based on contextual information linked to a user of the computing device. For example, the user's computer file and directory use, the user's profile metadata (e.g., job metadata), the user's use of specialized applications or equipment and so forth may be used to formulate the contextual information that is leveraged by the computing device in selecting the directories, applications and files identified in the GUI.

In general, a system can select files requiring a user verification for applying a file management policy based on the number of factors. For example, files can be selected for a user verification based on, but limited to, user activity associated with the files, an activity priority of one or more files, a detected use of specialized applications, or a detected use of specialized equipment.

Figure 1:
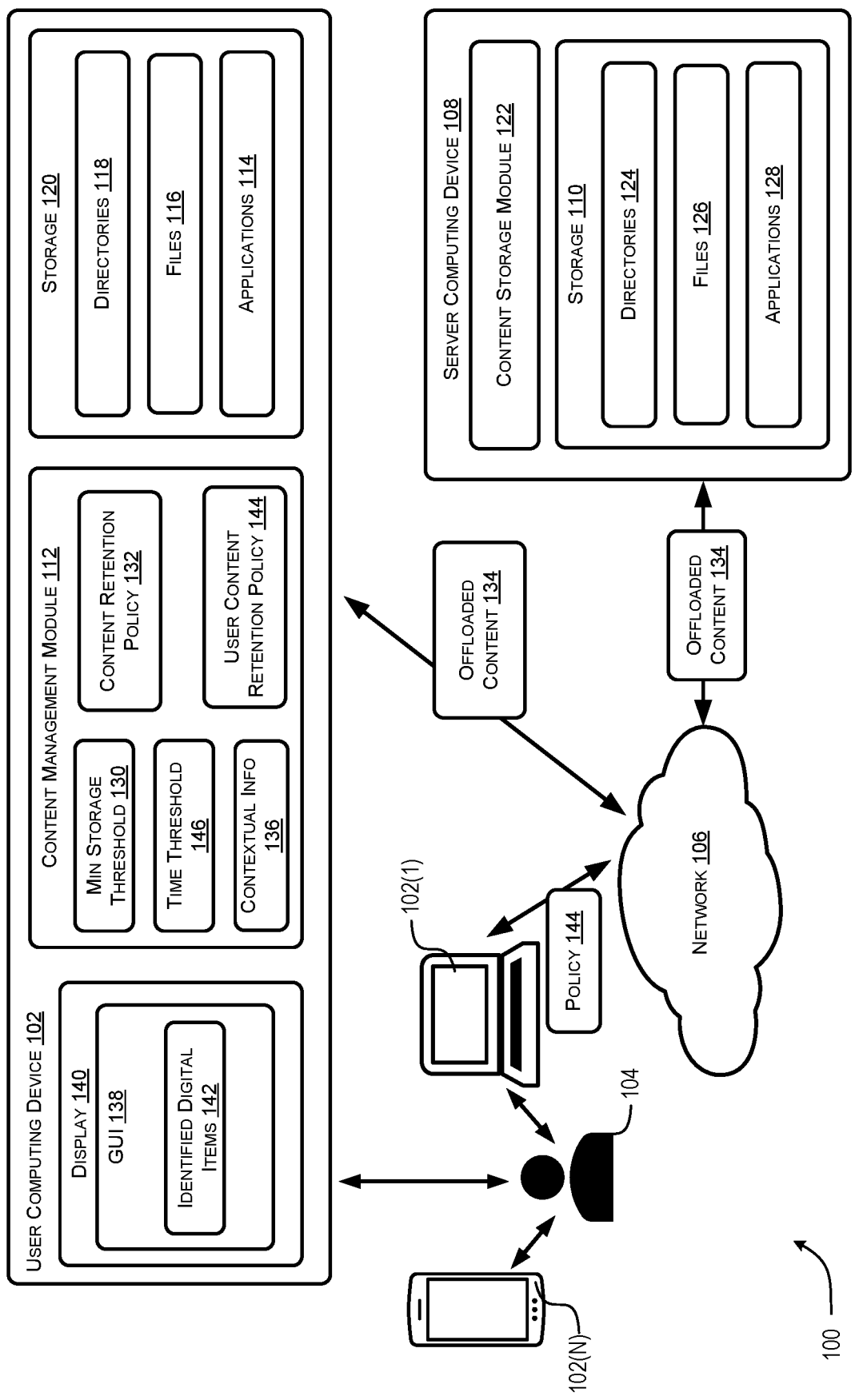
FIG. 1 illustrates an exemplary system for local storage management of content according to some implementations
Figure 2:
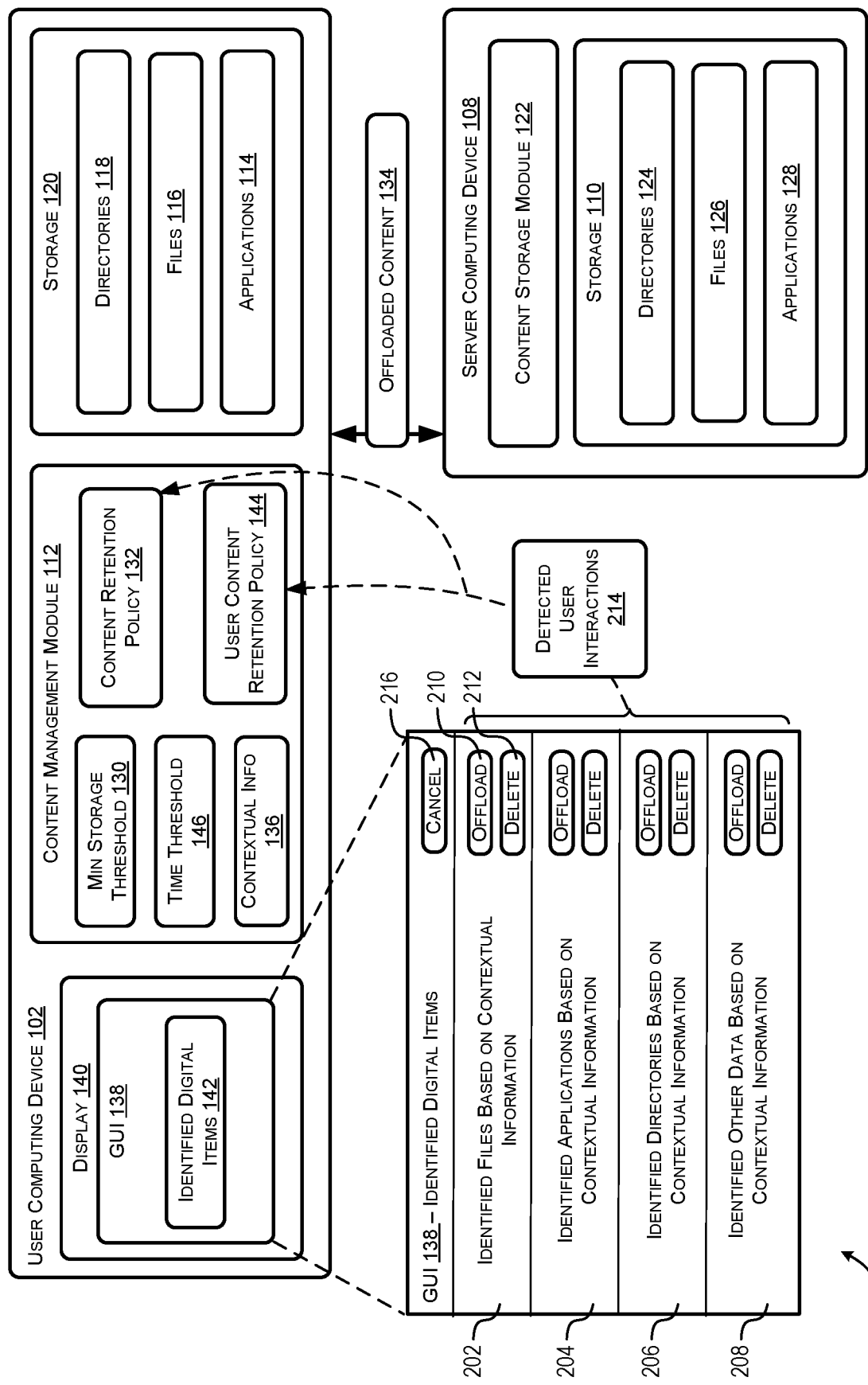

FIG. 1 illustrates an exemplary system 100 for local storage management of content, such as user data or digital items, according to some implementations. The system 100 may enable one or more user computing devices 102 associated with a user 104 to communicate over one or more networks 106 with a server computing device 108 that includes a storage 110.

The one or more networks 106 can include any suitable network, including a wide area network, such as the Internet; a local area network, such an intranet; a wireless network, such as a cellular network, a local wireless network, such as Wi-Fi and/or close-range wireless communications, such as BLUETOOTH®; a wired network; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail.

In the illustrated implementation, a plurality of the user computing devices 102, 102(1), . . . 102(N) are associated with the user 104, where N is an integer. For example, the first user computing device 102 may be a tablet computer, the next user computing device 102(1) may be a laptop computer, and the Nth electronic device 102(N) may be a mobile device, although various types and pluralities of computing devices may be associated with the user 104. Further, while a single user 104 is illustrated in this example, in other examples, there may be a large number of users 104, each having one or more respective user computing devices 102.

One or more of the user computing devices 102 may include an instance of a content management module 112 that executes on the respective user computing device 102. In some implementations, the content management module 112 is a process that executes in the background autonomously. For example, the content management module 112 may execute in the background, without user input, to provide content management functionality.

The content management module 112 may provide content management functionality, through one or more rules, to the user computing device 102 for controlling which content is stored locally on the user computing device 102 and which content may be offloaded (e.g., dehydrated, uploaded, compressed, and/or removed) from the computing device 102. In general, offloading of content can mean any operation that increases the available storage space of a system. In some implementations, offloading can include any combination of operations, such as uploading and dehydrating a file, uploading and deleting a file, compressing a file, deleting a file, and so forth. As described herein, a system can select any operation that best suited for a file type, the activity associated with a file, a source of the file, a path location of where the file is stored, or any other attribute of a file. The foregoing description of offloading of content applies to any suitable digital item type.

Examples of content that may be maintained on the user computing device 102, and potentially offloaded from the device 102 to increase available storage space, include digital items such as applications 114, files 116, and/or directories 118. The applications 114, files 116 and/or directories 118 may be stored on a storage 120 of the user computing device 102. Other digital items may also be included on the storage 120.

In some examples, the server computing device 108 may be provided by a service provider. For instance, various service providers provide distributed storage or other network storage to the public, typically for a fee based at least in part on the amount of storage space consumed by an individual user. However, implementations herein are not limited to public distributed storage services, and may be extended to other types of network-accessible storage and storage services. As several alternative examples, the server computing device 108 may be a network-attached storage, a desktop computing device, or the like, such as a computer storage maintained by the user 104 or other entity.

In the illustrated example, the server computing device 108 includes a content storage module 122 that may be executed by the server computing device 108. The server computing device 108 may include or may be in communication with the user computing device 102, such as by direct connection, or via the one or more networks 106. Accordingly, the user computing device 102 and the server computing device 108 are able to communicate over the one or more networks 106 using wired or wireless connections, and combinations thereof.

The content storage module 122 on the server computing device 108 may manage the storage of the content on the storage 110, and may control access to users' content on the storage 110. Some of the content on the storage 110 may include content that is offloaded from the user computing device 102. Such content offloaded from the user computing device 102 may be managed by the content storage module 122.

The storage 110 may be provided by a commercial storage service, and may be enterprise level storage arrays, such as may be maintained in a storage area network, a storage cluster, a RAID (redundant array of independent disks) array, a distributed storage node array, or various other types of storage configurations. As indicated, the storage 110 may store user data, which may include copies of some or all of one or more user's data, including the user's digital items such as directories 124, files 126, applications 128 and/or other data in content. For instance, some of the user's 104 content on each of the computing devices 102-102(N) may be synchronized and stored on the storage 110. Thus, in some cases, the individual computing devices 102-102(N) may each store locally different content of the user 104, while the storage 110 may store collective content of the user 104 that is from each of the computing devices 102-102(N).

In some examples, the content management module 112 may be a module of an operating system on the user computing device 102. In other examples, the content management module 112 may be a module separate from the operating system, such as may be included in one or more applications executable on the user computing device 102. For instance, the content management module 112 may have permissions for system-level access to content stored on the user computing device 102, such as the content on the storage 120. In addition, while the content management module 112 is illustrated in this example as residing on the user computing device 102, in other examples, at least some of the functionality of the module 112 may reside on the server computing device 108 or other suitable computing device.

The content management module 112 may manage a storage level of the storage 120. Specifically, the content management module 112 functions, based on rules associated with the module 112, to offload (e.g., dehydrate, compress, and/or remove) content on the storage 120 when the storage 120 is determined to be below or equal to a minimum storage threshold 130. When content, such as a file, is dehydrated, the file is converted to a placeholder on the storage by moving the file's primary data to the storage 110. In other implementations, the content management module 112 may manage the storage level of the storage when manually caused to execute by the user 104. In some implementations, the content management module 112 may manage the storage level of the storage 110 automatically and in the background from time to time based on a predetermined schedule, such as once a month or after a time period from a previous execution of the content management module 112. Furthermore, in some implementations, the content management module 112 may manage the storage level of the storage 110 when it is determined that a pending install of an application or other data, such as a software update, pictures, audio, video or other media, is not possible because there is insufficient storage space on the storage 110.

A content retention policy 132 may be referenced by the content management module 112 to aid in the identification of digital items, such as directories 118, files 116 and/or applications 114 that may be offloaded from the storage 120. The content retention policy 132 may include rules identifying file types by file extension (e.g., .log, .tmp), temporary directories (e.g., directories containing temporary files or digital items, directories created for temporary use), thumbnails, applications and other content and items that may be offloaded when the content management module 112 determines that a storage capacity of the storage 120 is equal or below a minimum storage threshold 130, or when the content management module 112 is otherwise caused to execute either automatically or manually by the user 104.

Content identified by the content retentions policy 132, once the policy 132 and it rules are executed by the content management module 112, may be offloaded to the server computing device 108 for storage on the storage 110. For example, the content storage module 122 may receive and manage offloaded content 134, such that the offloaded content 134 is stored on the storage 110 and linked to the user 104. Linking the offloaded content 134 to the user 104 enables the content management module 112 to request retrieval of the content 134, on behalf of the user 104, and download the offloaded content 134 at some later time. Such as request to download the offloaded content 134 may be received and processed by the content storage module 122.

The content management module 112 may determine that the storage capacity of the storage 120 remains equal or below the minimum storage threshold 130 subsequent to the execution of the content retention policy 132. The content management module 112 may be caused to otherwise execute automatically or manually after the execution of the content retention policy 132, such as when it is determined that the content management module 112 did not create enough space in the storage 120 to allow installation of additional content in the storage 120.

The content management module 112 may reference contextual information 136 to aid in the identification of additional digital items such as directories 118, files 116 and/or applications 114 (also referred to herein as digital items 142) that may be offloaded from the storage 120. The additional digital items 142 may be displayed in a graphical element, such as a GUI 138 associated with a display 140. Specifically, the GUI 138 may display one or more digital items 142 that the content management module 112 identified based on the contextual information 136.

In some implementations, the additional digital items 142 may be presented using audio generated by the user computing device 102. The content management module 112 may generate the audio of the additional digital items 142. The user 104 may respond to the audio of the additional digital items 142 using voice commands. For example, the user 104 may use a voice commanded to confirm that the additional digital items 142 may be offloaded from the storage 120. The digital times 142 may also be presented to the user 104 via texts, emails, audio signals, alarms, etc. to get the attention of the user 104.

In some implementations, the user's 104 computer file and directory use, the user's 104 profile including metadata (e.g., job, specialized equipment use or interests), the user's 104 use of specialized applications or equipment and so forth may be used to formulate the contextual information 136 that is leveraged by the content management module 112 in selecting the identified digital items 142 displayed by the GUI 138.

Furthermore, in some implementations, the contextual information 136 is at least partially derived from the user's 104 interaction with the GUI 138 that includes the identified digital items 142 that may be offloaded to the storage 110 or deleted. The user 104 may interact with the GUI 138 using an input device (e.g., mouse, stylus, or finger touch) or using voice.

For example, the content management module 112 may detect and analyze and learn from the user's 104 interactions, with the GUI 138, approving and/or disapproving of suggested actions that may be taken with respect to the identified digital items 142 in the GUI 138. The analysis and learning performed by the content management module 112 may provide a basis for subsequently augmenting the rules of the module 112 by adding to or removing at least some of the identified digital items 142 displayed in the GUI 138. Alternatively, or in addition, the analysis and learning performed by the content management module 112 may provide a basis for modifying a local storage reduction background process, such as the content retention policy 132 executed by the module 112, by adding to or removing the types of digital items, referenced by the policy 132 and its rules, that may be offloaded to the storage 110, or deleted, when the content management module 112 executes the content retention policy 132.

In some implementations, the analysis and learning performed by the content management module 112 may cause the module 112 to generate a user content retention policy 144 that replaces the content retention policy 132 or is in addition to the content retention policy 132. The user content retention policy 144 may be a modified version of the content retention policy 132. The user content retention policy 144 may be linked to the user 104, such as a profile of the user 104, and propagated by the content management module 112 to other user computing devices 102(N) used by the user 104.

The user content retention policy 144 is illustrated as being shared with the computing device 102(1). The policy 144 may also be shared with other computing devices 102 used by the user 104. In some implementations, a most current version of the policy 144, which may be on any one of the user computing devices 102-102(N), may be propagated to each of the user computing devise 102-102(N).

FIGS. 2-5A illustrate the exemplary system 100 to include an illustration of the GUI 138 according to some implementations. The GUI 138 includes UI sections 202-208 identifying, with data, digital items selected by the content management module 112 based on the contextual information 136.

In this disclosure, messages or communications exchanged between various computing devices may include data representing the herein described actions to be performed by the computing devices and/or responses provided by those computing devices.

For example, the UI section 202 identifies one or more files selected by the content management module 112 based on the contextual information 136. The UI section 204 identifies one or more applications selected by the content management module 112 based on the contextual information 136. Additionally, the UI section 206 identifies one or more directories selected by the content management module 112 based on the contextual information 136. Furthermore, the UI section 208 identifies other data selected by the content management module 112 based on the contextual information 136.

Each of the UI sections 202-208 includes user selectable options 210 and 212. The user selectable options 210 and 212 associated with each of the UI sections 202-208 are selectable using an input device (e.g., mouse) of the user computing device 102. When the user 104 selects the option 210, linked to one or more of the digital items identified in the relevant UI section 202, 204, 206 or 208, the selection is detected by the content management module 112. The content management module 112 causes the offloading of the one or more of the digital items for storage on the storage 110 in response to the selection of the option 210.

Alternatively, when the user 104 selects the option 212, linked to one or more the digital items identified in the relevant UI section 202, 204, 206 or 208, the selection is detected by the content management module 112. The content management module 112 causes the deletion of the one or more of the digital items, from the storage 120, in response to the selection of the option 212.

In some implementations, the user 104 may interface with an option 216 to close the GUI 138 and/or to indicate that one or more of the digital items identified in the UI sections 202, 204, 206 or 208 should not be offloaded. In some implementations, at least one of the UI sections 202, 204, 206 and 208 include the option 216 that enables the user 104 to select that no action should be taken with respect to the digital items identified in the UI section 202, 204, 206 or 208.

Detected user interaction 214 with the GUI 138 may be captured by the content management module 112. The detected user interactions 214 may be analyzed (e.g., learning) by the content management module 112. Specifically, the content management module 112 may analyze the detected user interactions 214 to determine the digital items 142 and other data that were selected by the user 104 for offloading to the storage 110. Furthermore, the content management module 112 may analyze the detected user interactions 214 to determine the digital items 142 that were selected by the user 104 for deletion from the storage 120. Additionally, the content management module 112 may analyze the detected user interactions 214 to determine that digital items 142 were not selected for offload, either through the user's 104 selection of the option 216 or the user's 104 inaction with respect to the GUI 138.

The analysis and learning performed by the content management module 112 may provide a basis for subsequently adding to or removing at least some of the identified digital items 142 displayed in the GUI 138. Alternatively, or in addition, the analysis and learning performed by the content management module 112 may provide a basis for modifying a local storage reduction background process, such as the content retention policy 132 executable by the module 112, by adding to or removing the types digital items, referenced by the policy 132 and its rules, that may be offloaded to the storage 110, or deleted, when the content management module 112 executes the content retention policy 132.

In some implementations, the analysis and learning performed by the content management module 112 may cause the module 112 to generate the user content retention policy 144 that replaces the content retention policy 132 or is in addition to the content retention policy 132. The user content retention policy 144 may be linked to the user 104, such as a profile of the user 104, and propagated by the content management module 112 to other user computing devices 102(N) used by the user 104.

Figure 3:
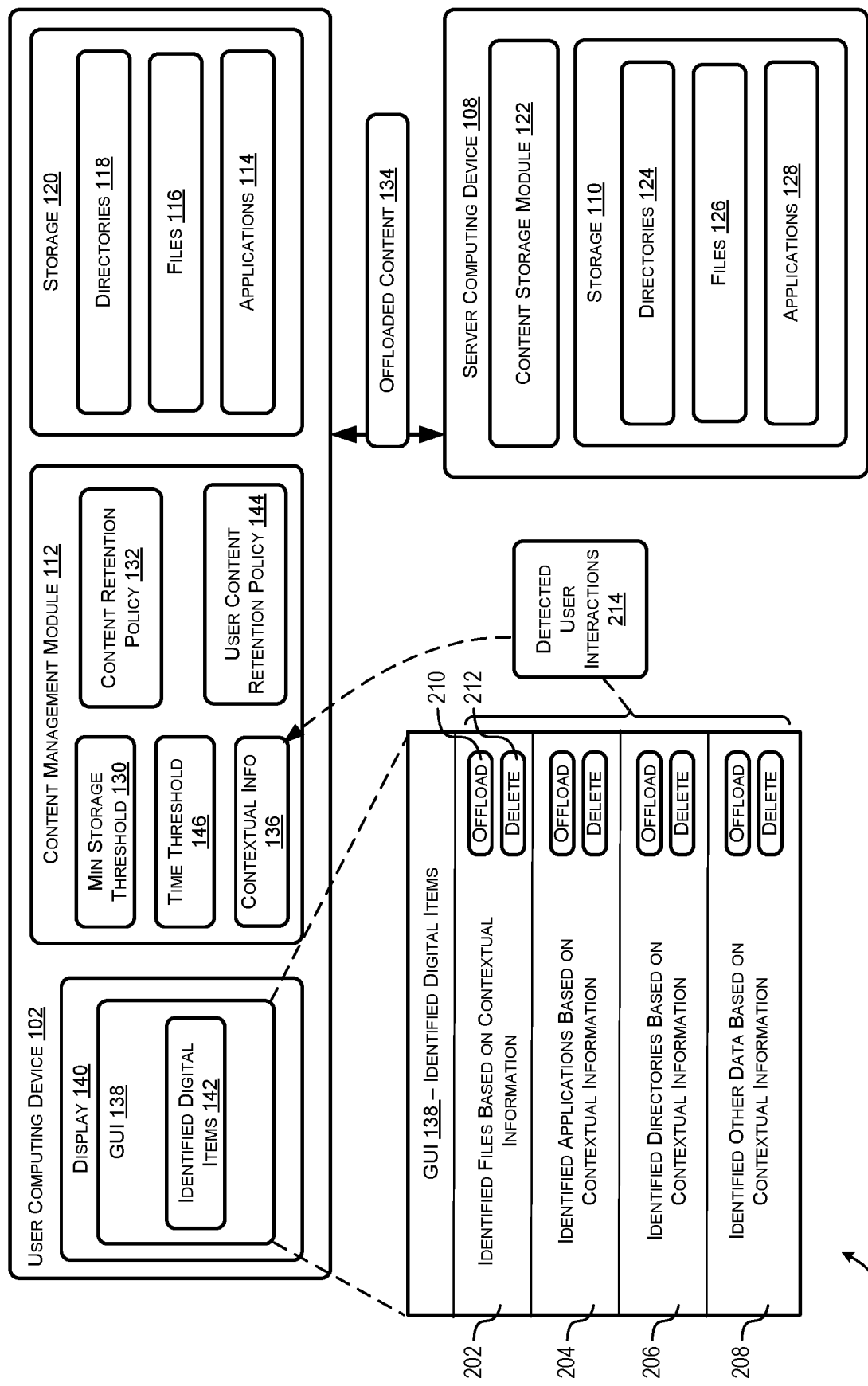

Referring to FIG. 3, the content management module 112 may use the detected user interactions 214 to augment the contextual information 136. Specifically, the content management module 112 may analyze the detected user interactions 214 to determine digital items that were selected by the user 104 for offloading to the storage 110. Furthermore, the content management module 112 may analyze the detected user interactions 214 to determine the digital items that were selected by the user 104 for deletion from the storage 120. Additionally, the content management module 112 may analyze the detected user interactions 214 to determine the digital items that were not selected for offload, either through the user's 104 selection of the option 216 or the user's 104 inaction with respect to the GUI 138. The analysis and learning performed by the content management module 112 may provide a basis modifying the contextual information 136.

Figure 4:
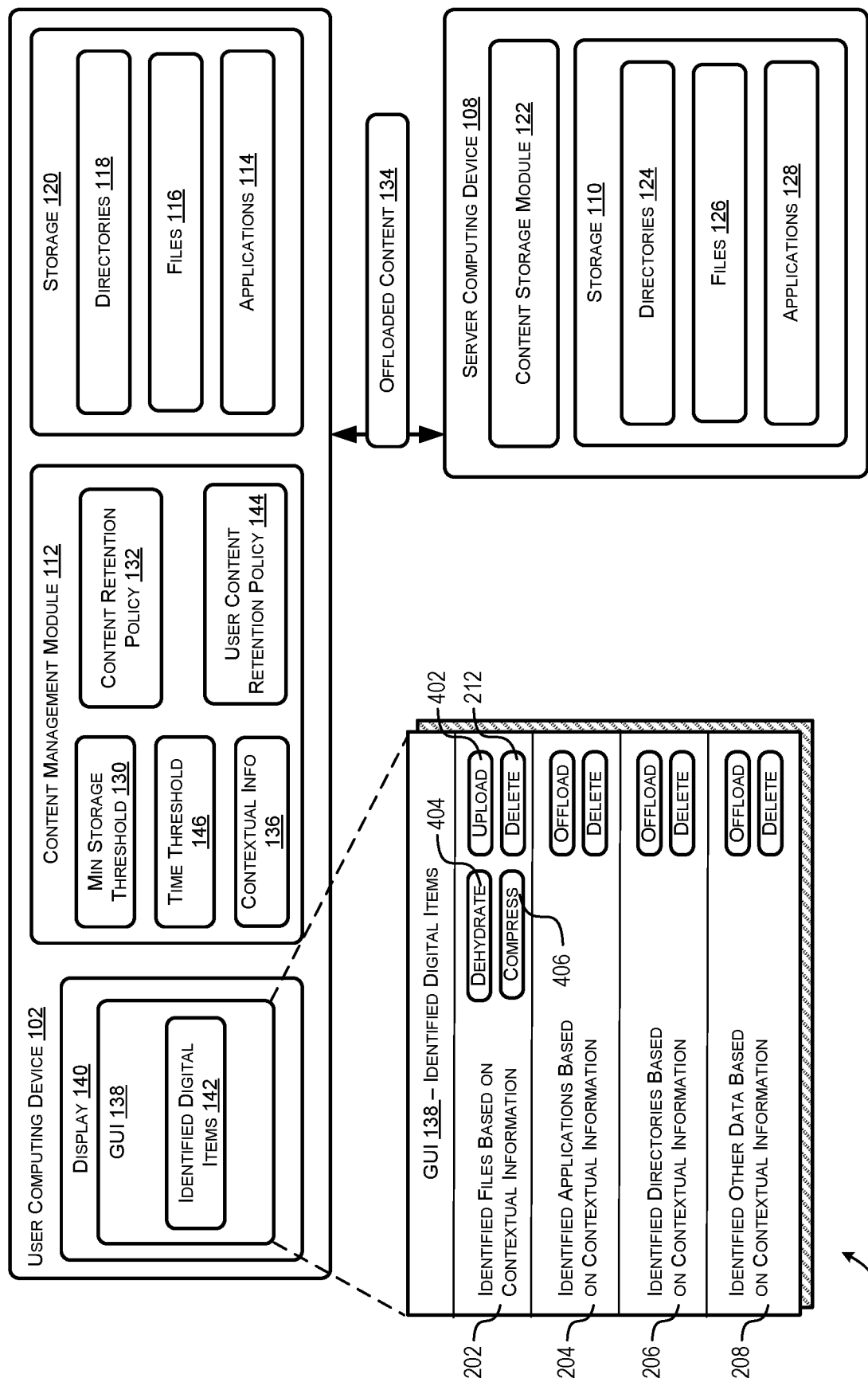

Referring to FIG. 4, the GUI 138 is shown as being displayed with greater prominence 402 compared to when the GUI 138 was previously displayed, for example, compared to the GUI 138 illustrated in FIGS. 2-4 and 5A. In some implementations, the detected user interaction 214 is the user's 104 inaction with respect to the GUI 138. Specifically, the GUI 138 may be displayed for a time threshold 146, such as a time period or time limit, and then caused by the content management module 112 to close due to the user's inaction with respect to items and content displayed in the GUI 138.

The GUI 138 may be displayed subsequently, with the greater prominence 402, when the content management module 112 determines that the storage 120 remains below the minimum storage threshold 130, or when the storage 130 has insufficient storage capacity to support the storage of additional content. Causing the GUI 138 to be displayed with the greater prominence 402 may include the use of larger fonts in the GUI 138, highlighting of the fonts, causing the GUI 138 to have a larger size, causing the GUI 138 to remain in the forefront of other windows displayed in the GUI 138, and so forth. User inaction with respect to digital items 142 for offload may also be presented to the user 104 via texts, emails, audio signals, alarms, etc. to get the attention of the user 104.

Additionally, the GUI 138 may be enhanced to include additional user selectable options 402-406 for offloading the digital items 142. The additional user selectable items 402-406 may be added to the GUI 138 by the content management module 112 in response to the user's 104 inaction with respect to additional digital items 142 identified for potential offloading from the storage 120.

Figure 5A:
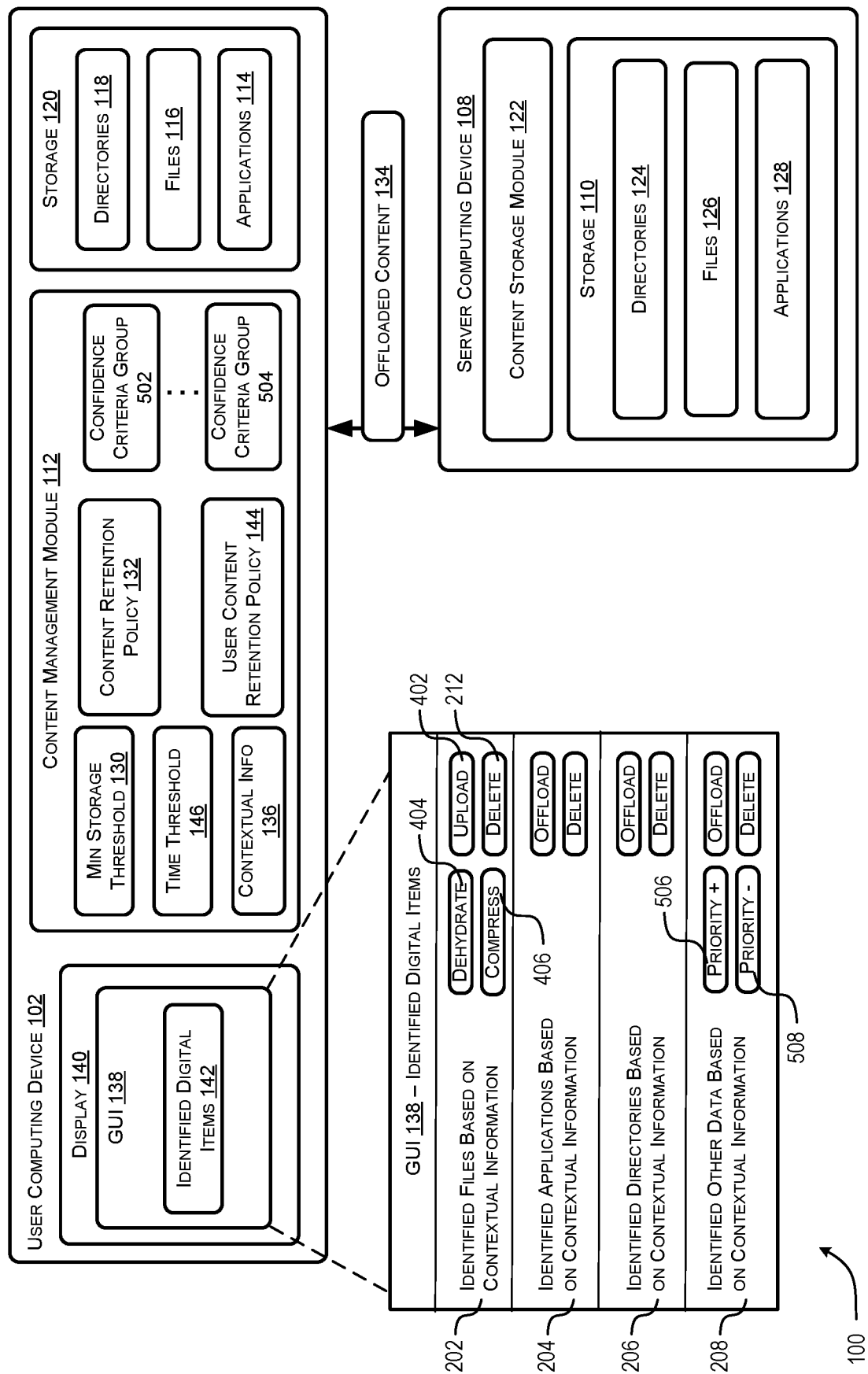

Referring to FIG. 5A, the content management module 112, in some implementations, may include one or more confidence criteria groups 502 and 504. The content management module 112 may include any number of confidence criteria groups 502 and 504.

The confidence criteria group 502 may include rules identifying one or more file types. For example, the confidence criteria group 502 may identify the one or more file types by known file extensions. In one example, the confidence criteria group 502 may identify temporary file extensions (e.g., .tmp), log file extensions (e.g., .log), help file extensions (e.g., .gid), and so forth. In some implementations, the confidence criteria group 502 may identify file types that are included in the group 502 based on the contextual information 136. The contextual information 136 may include historical data, also referred to herein as parameters of user input, from prior user interaction with the GUI 138 indicating approval for offloading digital items. Such contextual information 136 may be used by the content management module 112 to add to or remove one or more file types included within the confidence criteria group 502.

The content retention policy 132, when executed, may reference the confidence criteria group 502 to identify high confidence level files that may be offloaded to the server computing device 108 or deleted without explicit approval from the user 104.

The confidence criteria group 504 may also identify one or more file types. For example, the confidence criteria group 504 may identify the one or more file types by known file extensions. In one example, the confidence criteria group 504 may identify image file extensions (e.g., jpg), multimedia file extension (e.g., .mov), audio file extensions (e.g., .mp1-4), and the like.

The content retention policy 132, when executed, may reference the confidence criteria group of 504 to identify low confidence level files that may be offloaded to the server computing device 108 or deleted, but after approval from the user 104 is received or at least the user 104 is informed, via the GUI 138, that the files are pending for offload to the server computing device 108 or pending deletion. In some implementations, the confidence criteria group 504 may identify file types that are included in the group 504 based on the contextual information 136. The contextual information 136 may include historical data and parameters from prior user interaction with the GUI 138 indicating disapproval or inaction related to digital items 142 displayed in the GUI 138. Such contextual information 136 may be used by the content management module 112 to add to or remove one or more file types included within the confidence criteria group 504.

The content retention policy 132, when executed, may reference the confidence criteria group 504 to identify low confidence level files that may be offloaded to the server computing device 108 after explicit approval from the user 104 is received through the GUI 138, or at least displayed in the GUI 138 for a predetermined period of time, such as the time threshold 146, over a single display of the GUI 138, or several displays of the GUI 138.

In some implementations, one or more of the UI sections 202-208 identifying, with data, digital items selected by the content management module 112 based on the contextual information 136, may be augmented to include a user selectable UI element 506 to increase a priority for offloading one or more of the identified digital times 142. Furthermore, one or more of the UI sections 202-208 may be augmented to include a user selectable UI element 508 to decrease a priority for offloading one or more of the identified digital times 142. User input using the UI elements 506 and 508 may be captured by the content management module 112 and used to update the contextual information 136 so that similar digital items are prioritized for offloading consistent with the user's 104 priorities for offloading content to the server computing device 108.

FIG. 5B illustrates exemplary data and information that may be included in the contextual information 138. As illustrated, the contextual information 138 may be segmented into sections 520, 522 and 524. The number of sections illustrated in the contextual information 138 as well as the included information of those sections are exemplary.

The section 520 may include GUI 136 historical information and parameters obtained from one or more prior interactions, by the user 104, with the GUI 136. For example, the historical information may include the user's 104 tracked interactions with the GUI 136, to include inaction with respect to the GUI 136, digital items 142 confirmed for offload, digital items 142 displayed in the GUI 136 but ignored, determined after a period of time, by the user 104, and so forth.

The section 522 includes historical information and parameters linked to the user 104. In some implementations, the information included in the section 522 is gathered by the content management module 112 through observation of the user's 104 use of the user computing device 102. The section 522, in the illustrated example, may include the user's 104 directory, specialized equipment, and application uses. Furthermore, the section 522 may include metadata obtained from the user's 104 public, private and/or enterprise profiles.

The section 524 includes additional information also linked to the user 104. In the illustrated example, the section 524 includes a listing of exempt files and a listing of exempt directories. The listing of exempt files and the listing of exempt directories may be derived from information directly provided by the user 104, through the GUI 136 or another UI connected to the content management module 112. For example, the user 104 may use a UI to exempt certain digital items 142 from offloading actions executed by the content management module 112.

As disclosed herein, the contextual information 138 may be used by the content management module 112 in establishing or augmenting the rules included in the content retention policy 132 and/or the user content retention policy 144.

FIG. 5C illustrates exemplary data and information that may be included in the user content retention policy 144. As illustrated, the user content retention policy 144 may be segmented into sections 526, 528 and 530. The number of sections illustrated in the user content retention policy 144 as well as the included information of those sections are exemplary.

The user content retention policy 144 may be a modified version of the content retention policy 132. Therefore, in some implementations, the user content retention policy 144 includes some or all of the data and information associated with the content retention policy 132. The user content retention policy 144, in some embodiments, is a modified version of the content retention policy 132 using the contextual information 138.

In some implementations, the file type rules included in sections 526 and 528 are common across the content retention policy 132 and the user content retention policy 144. However, the section 530 includes contextual information based rules derived and machine learned through analysis, performed by the content management module 112, of the contextual information 136. In some implementations, the content retention policies 132 and/or 144 may include digital items, machine learned by the content management module 112, through analysis of digital items types offloaded by a collection of other users or background processes of their computing devices, where those digital item types are stored in a server computing device (e.g., the device 108). For example, the server computing device may store a collection of digital item types, such as directory names, application types and/or names, file types by extension (e.g., .tmp), and so forth, offloaded by the collection of other users or by a background process to offload digital items from a computing device.

The section 526 includes references to file types and directories that may be autonomously offloaded, from the user computing device 102, when the user content retention policy 144 is executed by the content management module 112.

The section 528 includes references to file types and directories that may be displayed in the GUI 136 for approval by the user 104 for offload from the user computing device 102, when the user content retention policy 144 is executed by the content management module 112.

The rules included in the sections 526-530 can be generated or changed by the content management module 112 from user input confirming to offload digital items from the storage 120 to the storage 110. For example, when the user 104 selects to delete a digital item, the content management module 112 may augment the contextual information 136 and one or more of the confidence criteria groups 502-504 to raise a confidence level to a highest level so that similar digital items may be subsequently deleted automatically. In another example, when the user 104 selects to dehydrate a digital item, the content management module 112 may augment the contextual information 136 and one or more of the confidence criteria groups 502-504 to set the confidence level to a medium level so that similar digital items may be subsequently dehydrated automatically. In another example, when the user 104 selects to compress a digital item, the content management module 112 may augment the contextual information 136 and one or more of the confidence criteria groups 502-504 to set the confidence level to a low-level so that similar digital items may be subsequently compressed automatically.

Figure 6:
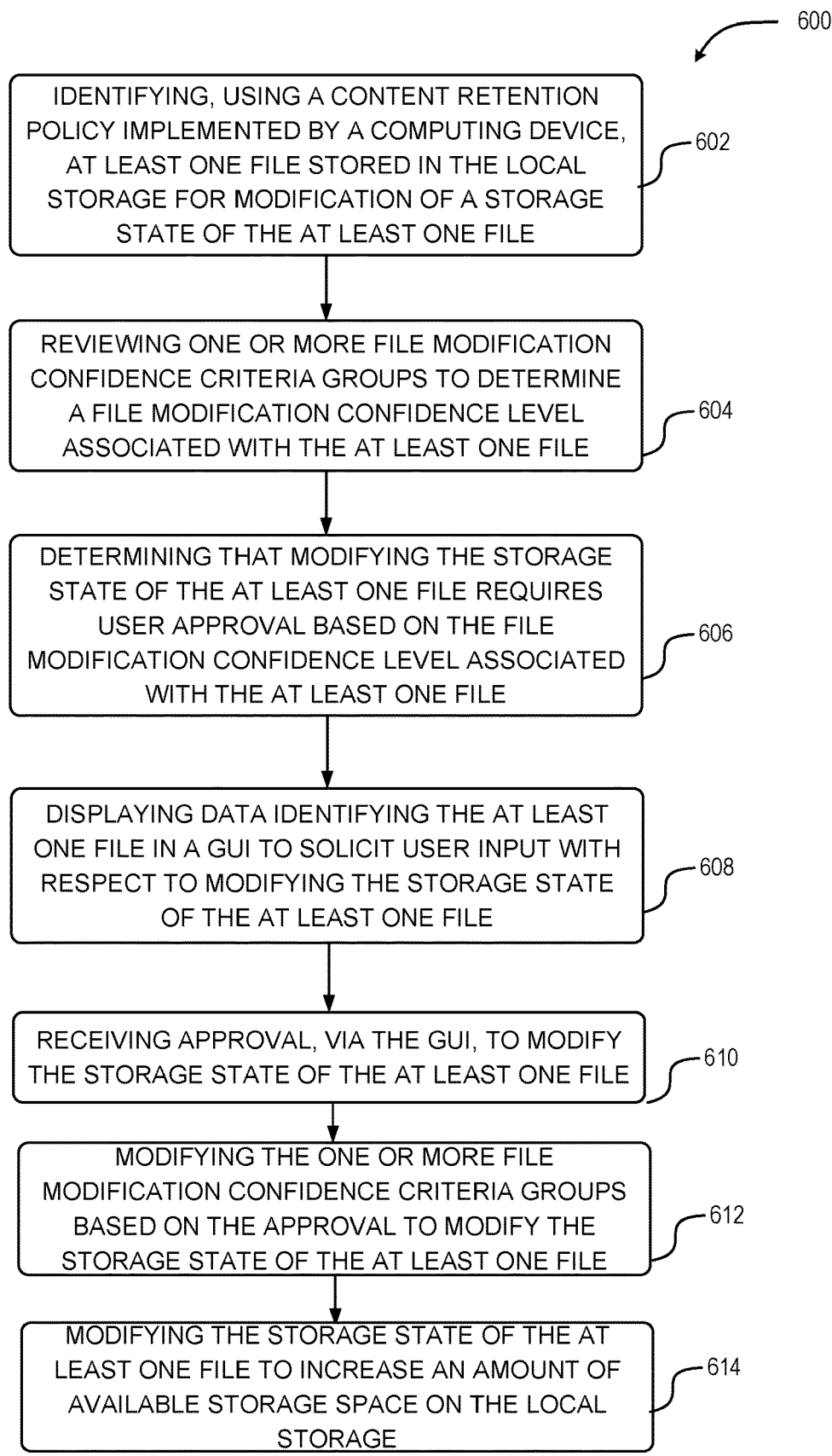
FIG. 6 is a flow diagram showing aspects of a routine disclosed herein for managing local storage, according to some implementations.

FIG. 6 is a flow diagram showing aspects of one routine 600 disclosed herein for creating managing local storage consumption in a computing device, according to one exemplary embodiment. In some implementations, the operations shown in FIG. 6 can be performed by components of one or more computing devices, such one or more of the devices 102. Therefore, the instructions associated with the routine 102 may be executed by one or more processors associated the devices 102.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system (e.g., the device(s) 102) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Furthermore, the logical operations described herein may be implemented by a single computing device, such as a client device or a server device. Alternatively, the logical operations described herein may be implemented by a combination of server devices and client devices.

The routine 600 may begin at operation 602, where at least one file stored in a local storage is identified for modification of the storage state of the at least one file. For example, a content retention policy may identify the at least one file for removal from the local storage. For example, the content retention policy may identify that the at least one file may be moved to distributed storage or dehydrated to the distributed storage. In some implementations, the at least one file is stored on the storage 120 and the distributed storage is associated with the server computing device 108.

At operation 604, one or more of file modification confidence criteria groups are reviewed to determine a file modification confidence level associated with the at least one file for removal from the local storage. A low confidence level associated with the at least one file indicates that a user must approve of the deletion or removal of the at least one file from the local storage. On the other hand, a high confidence level associated with the at least one file indicates that user approval is not necessary before the deletion or removal of the at least one file from the local storage is executed by a computing device.

At operation 606, based on the file modification confidence level associated with the at least one file, it is determined that modifying the storage state of the at least one file requires user approval.

At operation 608, data identifying the at least one file is displayed in a GUI, such as the GUI 138, to solicit user approval to modify the storage state of the at least one file.

At operation 610, user approval, received via the GUI, to modify the storage state of the at least one file is received.

At operation 612, the one or more file modification confidence criteria groups is modified based on the user approval to modify the storage state that at least one file.

At operation 614, the storage state of the at least one file is modified to increase in amount of available storage space on the local storage.

In some implementations, one or more of the operations 602-614 are performed as a background process that is insulated or hidden from a user. Specifically, the operations 602-614 may be executed on a background execution thread by an operating system, such as the MICROSOFT WINDOWS operating system, software application, and so forth.

Figure 7:
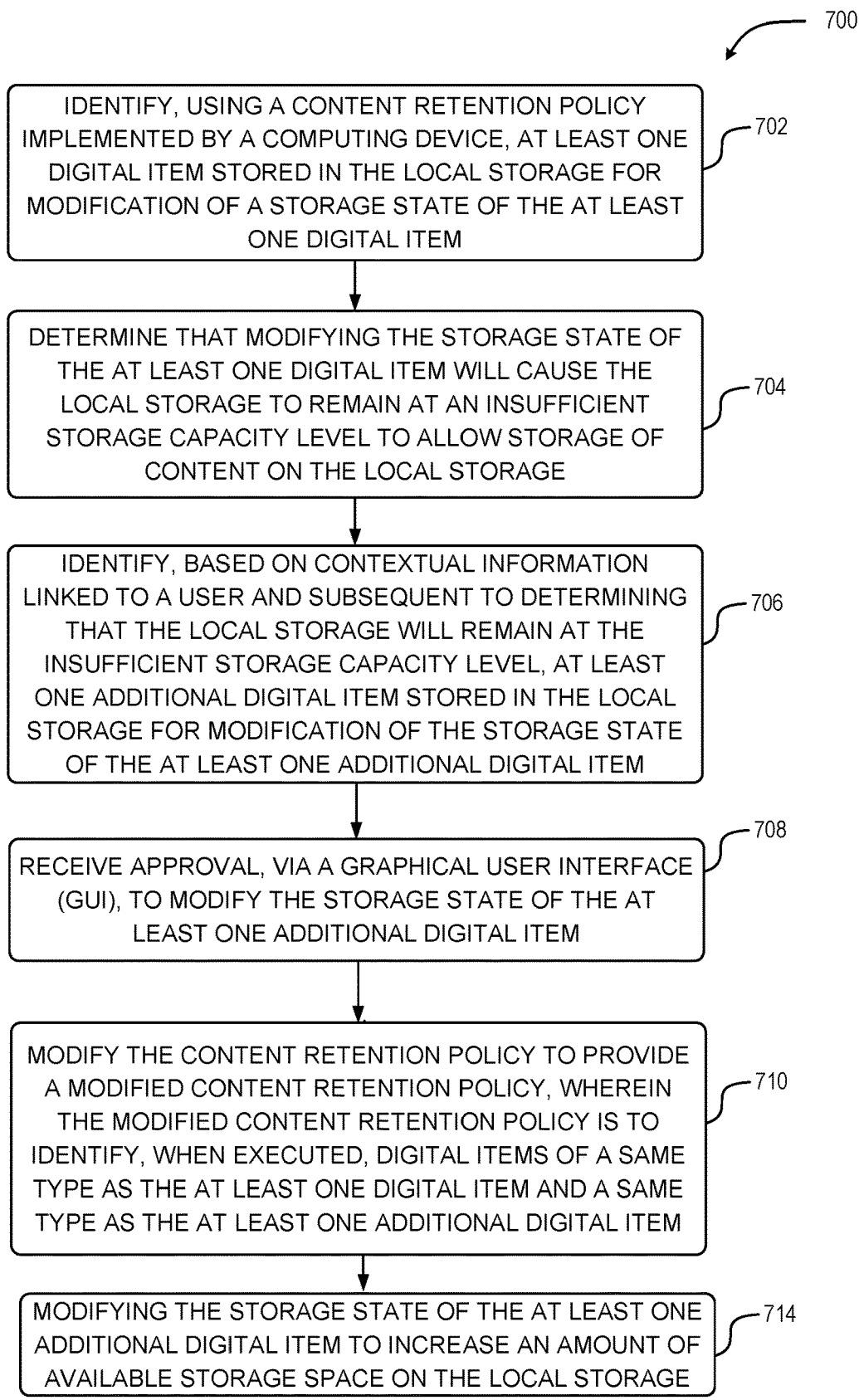
FIG. 7 is a flow diagram showing aspects of another routine disclosed herein for managing local storage, according to some implementations.

FIG. 7 is a flow diagram showing aspects of one routine 700 disclosed herein for managing local storage, according to one exemplary embodiment. In some implementations, the operations shown in FIG. 7 can be performed by components of one or more computing devices, such one or more of the devices 102. Therefore, the instructions associated with the example routine 700 may be executed by one or more processors associated with the devices 102.

The routine 700 may begin at operation 702, where at least one file stored in a local storage is identified for modification of the storage state of the at least one file. For example, a content retention policy may identify the at least one file for removal from the local storage. For example, the content retention policy may identify that the at least one file may be moved to distributed storage or dehydrated to the distributed storage. In some implementations, the at least one file is stored on the storage 120 and the distributed storage is associated with the server computing device 108.

At operation 704, it is determined that modifying the storage state of the at least one digital item will cause the local storage to remain at an insufficient storage capacity level to allow storage of content on the local storage.

At operation 706, at least one additional digital item stored in the local storage is identified for modification of the storage state of the at least one additional digital item. Identifying the at least one additional digital item may be based on analysis of contextual information linked to a user and subsequent to the operation 704.

At operation 708, approval is received to modify the storage state of the at least one additional digital item. The approval may be received via a GUI, such as in the GUI 138.

At operation 710, the content retention policy is modified to provide a modified content retention policy. The modified content retention policy identifies, when executed, digital items of the same type as the at least one digital item and digital items of the same type as the at least one additional digital item.

At operation 712, the storage state of the at least one additional digital item is modified to increase the amount of available storage space on the local storage.

In some implementations, one or more of the operations 702-712 are performed using a background execution thread. Specifically, the operations 702-712 may be performed by a background thread executed by an operating system, such as the MICROSOFT WINDOWS operating system, software application, and so forth.

Figure 8:
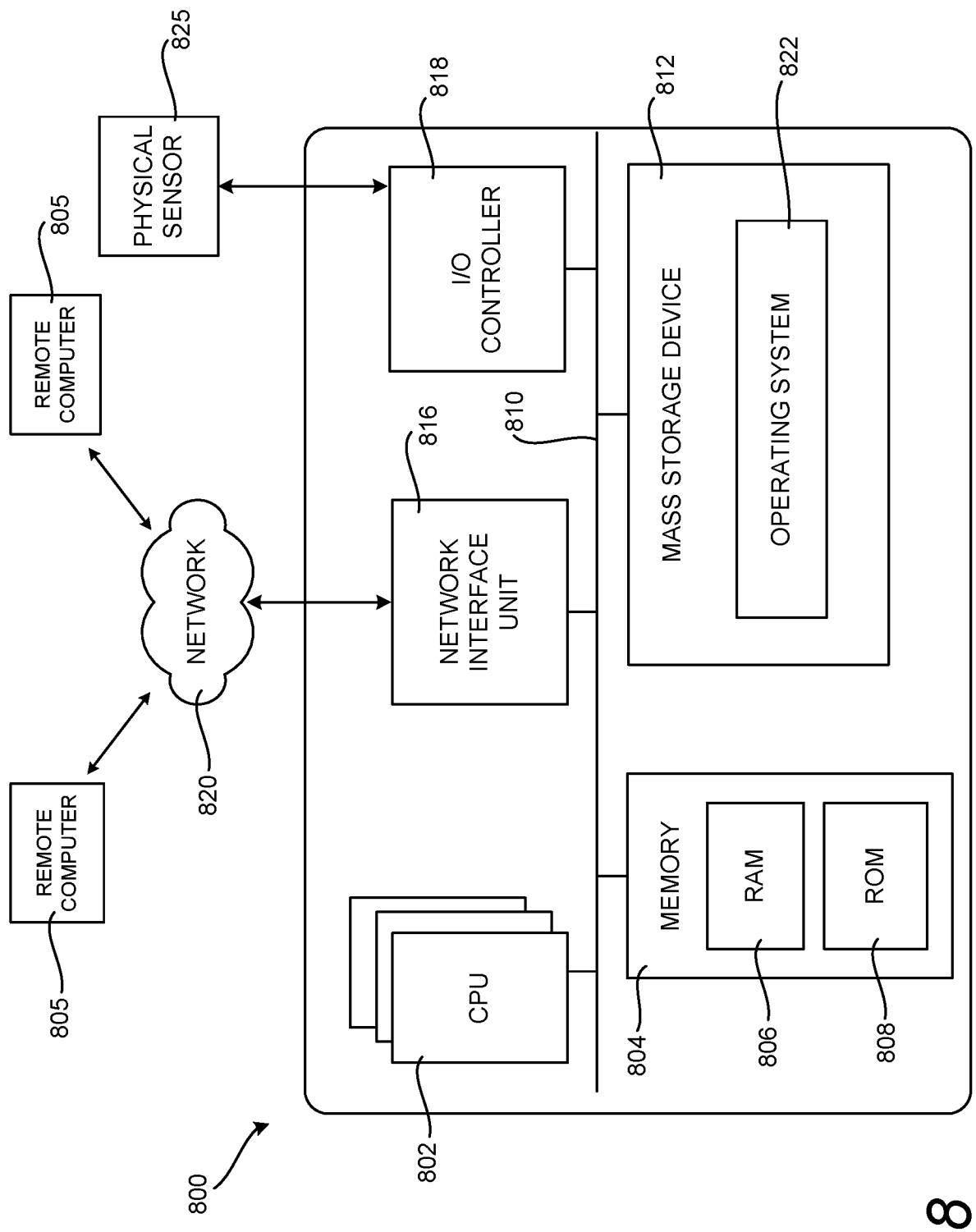
FIG. 8 is a computer architecture diagram showing an illustrative computer hardware and software architecture for a computing device that can implement aspects of the technologies presented herein.

FIG. 8 is a computer architecture diagram showing an illustrative computer hardware and software architecture for a computing device 800 that can implement the various technologies presented herein. In particular, the architecture illustrated in FIG. 8 can be utilized to implement a server computer, mobile phone, an e-reader, a smartphone, a desktop computer, an AR/VR device, a tablet computer, a laptop computer, or another type of computing device. In some implementations, the devices 102 implement some or all of the elements and functionalities associated with the computing device 800.

The computer 800 illustrated in FIG. 8 includes a central processing unit 802 (CPU), a system memory 804, including a random-access memory 806 (RAM) and a read-only memory (ROM) 808, and a system bus 810 that couples the memory 804 to the CPU 802. A basic input/output system (BIOS or firmware) containing the basic routines that help to transfer information between elements within the computer 800, such as during startup, can be stored in the ROM 808. The computer 800 further includes a mass storage device 812 for storing an operating system 822, application programs, and other types of programs. The mass storage device 812 can also be configured to store other types of programs and data.

The mass storage device 812 is connected to the CPU 802 through a mass storage controller (not shown on FIG. 8) connected to the bus 810. The mass storage device 812 and its associated computer readable media provide non-volatile storage for the computer 800. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and which can be accessed by the computer 800. For purposes of the claims, the phrase "computer storage medium," and variations thereof, does not include waves or signals per se or communication media.

According to various configurations, the computer 800 can operate in a networked environment using logical connections to remote computers through a network such as the network 820. The computer 800 can connect to the network 820 through a network interface unit 816 connected to the bus 810. It should be appreciated that the network interface unit 816 can also be utilized to connect to other types of networks and remote computer systems. The computer 800 can also include an input/output controller 818 for receiving and processing input from a number of other devices, including a keyboard, mouse, touch input, an electronic stylus (not shown in FIG. 8), or a physical sensor such as a video camera. Similarly, the input/output controller 818 can provide output to a display screen or other type of output device (also not shown in FIG. 8).

It should be appreciated that the software components described herein, when loaded into the CPU 802 and executed, can transform the CPU 802 and the overall computer 800 from a general-purpose computing device into a special-purpose computing device customized to facilitate the functionality presented herein. The CPU 802 can be constructed from any number of transistors or other discrete circuit elements, which can individually or collectively assume any number of states. More specifically, the CPU 802 can operate as a finite-state machine, in response to executable instructions contained within the software modules disclosed herein. These computer-executable instructions can transform the CPU 802 by specifying how the CPU 802 transitions between states, thereby transforming the transistors or other discrete hardware elements constituting the CPU 802.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 800 in order to store and execute the software components presented herein. It also should be appreciated that the architecture shown in FIG. 8 for the computer 800, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 800 might not include all of the components shown in FIG. 8, can include other components that are not explicitly shown in FIG. 8, or can utilize an architecture completely different than that shown in FIG. 8.

Figure 9:
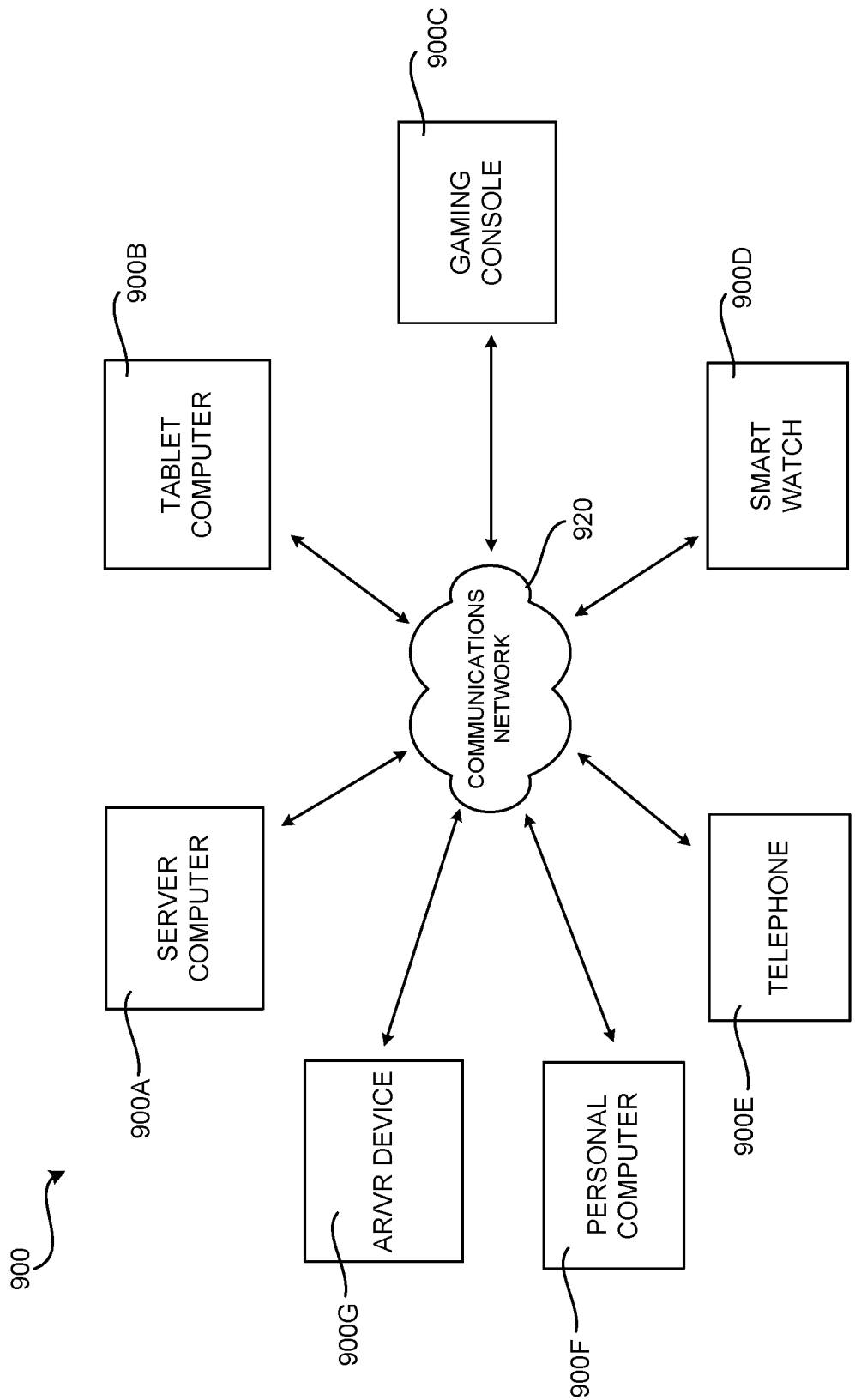
FIG. 9 is a network diagram illustrating a distributed computing environment in which aspects of the disclosed technologies can be implemented.

FIG. 9 is a network diagram illustrating a distributed network computing environment 900 in which aspects of the disclosed technologies can be implemented, according to various embodiments presented herein. The computing devices 102 may implement the distributed network computing environment 900 to provide distributed storage, via one or more distributed physical or virtual storages associated with one or more computing devices.

As shown in FIG. 9, one or more server computers 900A can be interconnected via a communications network 820 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of devices such as, but not limited to, a tablet computer 900B, a gaming console 900C, a smart watch 900D, a telephone 900E, such as a smartphone, a personal computer 900F, and an AR/VR device 900G.

In a network environment in which the communications network 820 is the Internet, for example, the server computer 900A can be a dedicated server computer operable to process and communicate data to and from the devices 900B-900G via any of a number of known protocols, such as, hypertext transfer protocol (HTTP), file transfer protocol (FTP), or simple object access protocol (SOAP). Additionally, the networked computing environment 900 can utilize various data security protocols such as secured socket layer (SSL) or pretty good privacy (PGP). Each of the devices 900B-900G can be equipped with an operating system operable to support one or more computing applications or terminal sessions such as a web browser (not shown in FIG. 9), or other graphical user interface (not shown in FIG. 9), or a mobile desktop environment (not shown in FIG. 9) to gain access to the server computer 900A.

The server computer 900A can be communicatively coupled to other computing environments (not shown in FIG. 9) and receive data regarding a participating user's interactions/resource network. In an illustrative operation, a user (not shown in FIG. 9) may interact with a computing application running on a device 900B-900G to obtain desired data and/or perform other computing applications.

The data and/or computing applications may be stored on the server 900A, or servers 900A, and communicated to cooperating users through the devices 900B-900G over an exemplary communications network 820. A participating user (not shown in FIG. 9) may request access to specific data and applications housed in whole or in part on the server computer 900A. These data may be communicated between the devices 900B-900G and the server computer 900A for processing and storage.

The server computer 900A can host computing applications, processes and applets for the generation, authentication, encryption, and communication of data and applications, and may cooperate with other server computing environments (not shown in FIG. 9), third party service providers (not shown in FIG. 9), network attached storage (NAS) and storage area networks (SAN) to realize application/data transactions.

It should be appreciated that the computing architecture shown in FIG. 8 and the distributed network computing environment shown in FIG. 9 have been simplified for ease of discussion. It should also be appreciated that the computing architecture and the distributed computing network can include and utilize many more computing components, devices, software programs, networking devices, and other components not specifically described herein.

The disclosure presented herein encompasses the subject matter set forth in the following clauses.

Clause 1. A computer implemented method for increasing an amount of available storage space on a local storage, the method comprising: executing an autonomous background process for a first set of files that comply with a confidence level defined by a content retention policy, wherein the autonomous background process comprises at least one operation for offloading the first set of files; identifying a second set of files that do not comply with the confidence level; requesting a confirmation to offload the second set of files; receiving an indication of the confirmation to offload the second set of files; and in response to receiving the indication of the confirmation to offload, storing an updated content retention policy based on parameters of the indication of the confirmation to offload, causing subsequent iterations of the autonomous background process to offload a third set of files identified utilizing the updated content retention policy.

Clause 2. The computer implemented method of clause 1, wherein the parameters define at least one of a delay period between a time of the request and a time of the indication of the confirmation to offload, an indication of an inaction within a time limit, or a selection of at least one file in the second set of files, wherein the parameters are utilized to update the content retention policy.

Clause 3. The computer implemented method of clause 1, wherein the request causes names of the second set of files to be displayed on a graphical user interface (GUI), an audio signal indicating names of the second set of files to be generated, or a graphical element to be displayed to solicit the confirmation to offload.

Clause 4. The computer implemented method according to clause 1, wherein the at least one operation for offloading the first set of files comprises at least one of deleting, moving, dehydrating, uploading, or compressing individual files of the first set of files.

Clause 5. The computer implemented method according to clause 1, further comprising: in response to receiving the indication of the confirmation to offload, executing the at least one operation for offloading the second set of files.

Clause 6. The computer implemented method according to clause 5, wherein the at least one operation for offloading the second set of files is executed in response to receiving the indication of the confirmation to offload by a user process.

Clause 7. The computer implemented method according to clause 1, wherein the confirmation to offload comprises a user-specified operation to perform on the second set of files.

Clause 8. The computer implemented method according to clause 7, further comprising: in response to receiving the indication of the confirmation to offload, executing, on the second set of files, the user-specified operation.

Clause 9. The computer implemented method according to clause 7, further comprising: setting, in the updated content retention policy, a confidence level of the second set of files to a confidence level associated with the user-specified operation.

Clause 10. The computer implemented method according to clause 7, further comprising: setting, in the updated content retention policy, a confidence level of the second set of files to a confidence level derived from a confidence level associated with the second set of files in the content retention policy and a confidence level associated with the user-specified operation.

Clause 11. A computer implemented method for managing a local storage, the method comprising: identifying, using a content retention policy implemented by a computing device, at least one digital item stored in the local storage for modification of a storage state of the at least one digital item; determining that modifying the storage state of the at least one digital item will cause the local storage to remain below or equal to a minimum storage threshold; identifying, based on contextual information and subsequent to determining that the local storage will remain below or equal to the minimum storage threshold, at least one additional digital item stored in the local storage for modification of the storage state of the at least one additional digital item; receiving an indication of approval to modify the storage state of the at least one additional digital item; and modifying the content retention policy to provide a modified content retention policy, wherein the modified content retention policy identifies, when executed, digital items of a same type as the at least one digital item and a same type as the at least one additional digital item.

Clause 12. The computer implemented method according to clause 11, further comprising linking the modified content retention policy to a unique user or a particular one or more computing devices associated with the unique user.

Clause 13. The computer implemented method according to clause 11, wherein the modified content retention policy enumerates a plurality of digital item storage state modification rules being autonomously executable by the computing device without direct user intervention.

Clause 14. The computer implemented method according to clause 13, wherein the plurality of digital item storage state modification rules comprises at least one default digital item storage state modification rule and at least one unique digital item storage state modification rule generated based on the contextual information derived from use of the computing device.

Clause 15. The computer implemented method according to clause 11, wherein the contextual information comprises use activity of one or more digital items in the local storage, wherein use activity is associated with one or more directories including one or more digital items, information obtained from digital item metadata, and/or information obtained from a user's profile.

Clause 16. A computing device, comprising: a processor; a computer-readable storage medium in communication with the processor, the computer-readable storage medium having computer-executable instructions stored thereupon which, when executed by the processor, cause the processor to: identify, using a content retention policy implemented by a computing device, at least one digital item stored in the local storage for modification of a storage state of the at least one digital item; determine that modifying the storage state of the at least one digital item will cause the local storage to remain at an insufficient storage capacity level; identify, based on contextual information linked to a user and subsequent to determining that the local storage will remain at the insufficient storage capacity level, at least one additional digital item stored in the local storage for modification of the storage state of the at least one additional digital item; receive user approval to modify the storage state of the at least one additional digital item; and modify the content retention policy to provide a modified content retention policy, wherein the modified content retention policy comprises identifying, when executed, digital items of a same type as the at least one digital item and a same type as the at least one additional digital item.

Clause 17. The computing device according to clause 16, wherein the content retention policy executes across a plurality of computing devices each associated with the user, and wherein the modified content retention policy is unique to the user.

Clause 18. The computing device according to clause 16, wherein the computer-executable instructions, when executed by the processor, cause the processor to further link the modified content retention policy to the user or a particular one or more computing devices associated with the user.

Clause 19. The computing device according to clause 16, wherein the user approval is received though a graphical user interface (GUI) identifying the at least one additional digital item.

Clause 20. The computing device according to clause 19, wherein the GUI comprises a plurality of identified additional digital items available for offload from the local storage.

As described, the technologies presented herein reduce local storage consumption in a computing device. A background process that offloads files from a local storage may be executed by a computing device. The background process automatically offloads files identified using rules that identify files for autonomous machine offload from the local storage.

Although the techniques have been described in language specific to structural features and/or methodological acts, it is to be understood that the appended claims are not necessarily limited to the features or acts described. Rather, the features and acts are described as example implementations of such techniques.

It should be appreciated that the above-described subject matter may be implemented as a computer-controlled apparatus, a computer process, a computing system, or as an article of manufacture such as a computer-readable storage medium. Among many other benefits, the techniques disclosed herein improve efficiencies with respect to a wide range of computing resources. Other technical effects other than those mentioned herein can also be realized from implementations of the technologies disclosed herein.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer implemented method for increasing an amount of available storage space on a local storage, the method comprising:
   executing an autonomous background process for a first set of files that comply with a confidence level defined by a content retention policy, wherein the autonomous background process comprises at least one operation for offloading the first set of files;
   identifying a second set of files that do not comply with the confidence level and that are nonexempt from offloading;
   identifying a third set of files that comply with the confidence level and that are exempt from offloading;
   requesting a confirmation to offload the second set of files;
   receiving an indication of the confirmation to offload the second set of files; and
   in response to receiving the indication of the confirmation to offload, storing an updated content retention policy based on parameters of the indication of the confirmation to offload,
   causing subsequent iterations of the autonomous background process to offload a fourth set of files identified utilizing the updated content retention policy.

2. The computer implemented method of claim 1, wherein the parameters define at least one of a delay period between a time of the request and a time of the indication of the confirmation to offload, an indication of an inaction within a time limit, or a selection of at least one file in the second set of files, wherein the parameters are utilized to update the content retention policy.

3. The computer implemented method of claim 1, wherein the request causes names of the second set of files to be displayed on a graphical user interface (GUI), an audio signal indicating names of the second set of files to be generated, or a graphical element to be displayed to solicit the confirmation to offload.

4. The computer implemented method according to claim 1, wherein the at least one operation for offloading the first set of files comprises at least one of deleting, moving, dehydrating, uploading, or compressing individual files of the first set of files.

5. The computer implemented method according to claim 1, further comprising:
   in response to receiving the indication of the confirmation to offload, executing the at least one operation for offloading the second set of files.

6. The computer implemented method according to claim 5, wherein the at least one operation for offloading the second set of files is executed in response to receiving the indication of the confirmation to offload by a user process.

7. The computer implemented method according to claim 1, wherein the confirmation to offload comprises a user-specified operation to perform on the second set of files.

8. The computer implemented method according to claim 7, further comprising:
in response to receiving the indication of the confirmation to offload, executing, on the second set of files, the user-specified operation.

9. The computer implemented method according to claim 7, further comprising:
setting, in the updated content retention policy, a confidence level of the second set of files to a confidence level associated with the user-specified operation.

10. The computer implemented method according to claim 7, further comprising:
setting, in the updated content retention policy, a confidence level of the second set of files to a confidence level derived from a confidence level associated with the second set of files in the content retention policy and a confidence level associated with the user-specified operation.

11. The computer implemented method of claim 1, wherein the third set of files are exempt from offloading based on an indication received from a user.

12. A computer implemented method for managing a local storage, the method comprising:
identifying, using a content retention policy implemented by a computing device, at least one digital item stored in the local storage for modification of a storage state of the at least one digital item, wherein the at least one digital item complies with a confidence level and is nonexempt from offloading;
determining that modifying the storage state of the at least one digital item will cause the local storage to remain below or equal to a minimum storage threshold;
identifying a first set of digital items that comply with the confidence level and that are exempt from offloading;
identifying a second set of digital items that do not comply with the confidence level and that are nonexempt from offloading;
identifying, based on contextual information and subsequent to determining that the local storage will remain below or equal to the minimum storage threshold, at least one additional digital item stored in the local storage for modification of the storage state of the at least one additional digital item, wherein the at least one additional digital item is identified from the second set of digital items;
receiving an indication of approval to modify the storage state of the at least one additional digital item; and
modifying the content retention policy to provide a modified content retention policy, wherein the modified content retention policy identifies, when executed, digital items of a same type as the at least one digital item and a same type as the at least one additional digital item.

13. The computer implemented method according to claim 12, further comprising linking the modified content retention policy to a unique user or a particular one or more computing devices associated with the unique user.

14. The computer implemented method according to claim 12, wherein the modified content retention policy enumerates a plurality of digital item storage state modification rules being autonomously executable by the computing device without direct user intervention.

15. The computer implemented method according to claim 14, wherein the plurality of digital item storage state modification rules comprises at least one default digital item storage state modification rule and at least one unique digital item storage state modification rule generated based on the contextual information derived from use of the computing device.

16. The computer implemented method according to claim 12, wherein the contextual information comprises use activity of one or more digital items in the local storage, wherein use activity is associated with one or more directories including one or more digital items, information obtained from digital item metadata, and/or information obtained from a user's profile.

17. A computing device, comprising:
a processor;
a computer-readable storage medium in communication with the processor, the computer-readable storage medium having computer-executable instructions stored thereupon which, when executed by the processor, cause the processor to:
identify, using a content retention policy implemented by a computing device, at least one digital item stored in the local storage for modification of a storage state of the at least one digital item, wherein the at least one digital item complies with a confidence level and is nonexempt from offloading;
determine that modifying the storage state of the at least one digital item will cause the local storage to remain at an insufficient storage capacity level;
identify a first set of digital items that comply with the confidence level and that are exempt from offloading;
identify a second set of digital items that do not comply with the confidence level and that are nonexempt from offloading;
identify, based on contextual information linked to a user and subsequent to determining that the local storage will remain at the insufficient storage capacity level, at least one additional digital item stored in the local storage for modification of the storage state of the at least one additional digital item, wherein the at least one additional digital item is identified from the second set of digital items;
receive user approval to modify the storage state of the at least one additional digital item; and
modify the content retention policy to provide a modified content retention policy, wherein the modified content retention policy comprises identifying, when executed, digital items of a same type as the at least one digital item and a same type as the at least one additional digital item.

18. The computing device according to claim 17, wherein the content retention policy executes across a plurality of computing devices each associated with the user, and wherein the modified content retention policy is unique to the user.

19. The computing device according to claim 17, wherein the computer-executable instructions, when executed by the processor, cause the processor to further link the modified content retention policy to the user or a particular one or more computing devices associated with the user.

20. The computing device according to claim 17, wherein the user approval is received though a graphical user interface (GUI) identifying the at least one additional digital item.

* * * * *